July 31, 1962
R. N. ABILD
3,046,734
ROCKET THRUST CONTROL
Filed June 30, 1959
3 Sheets-Sheet 1
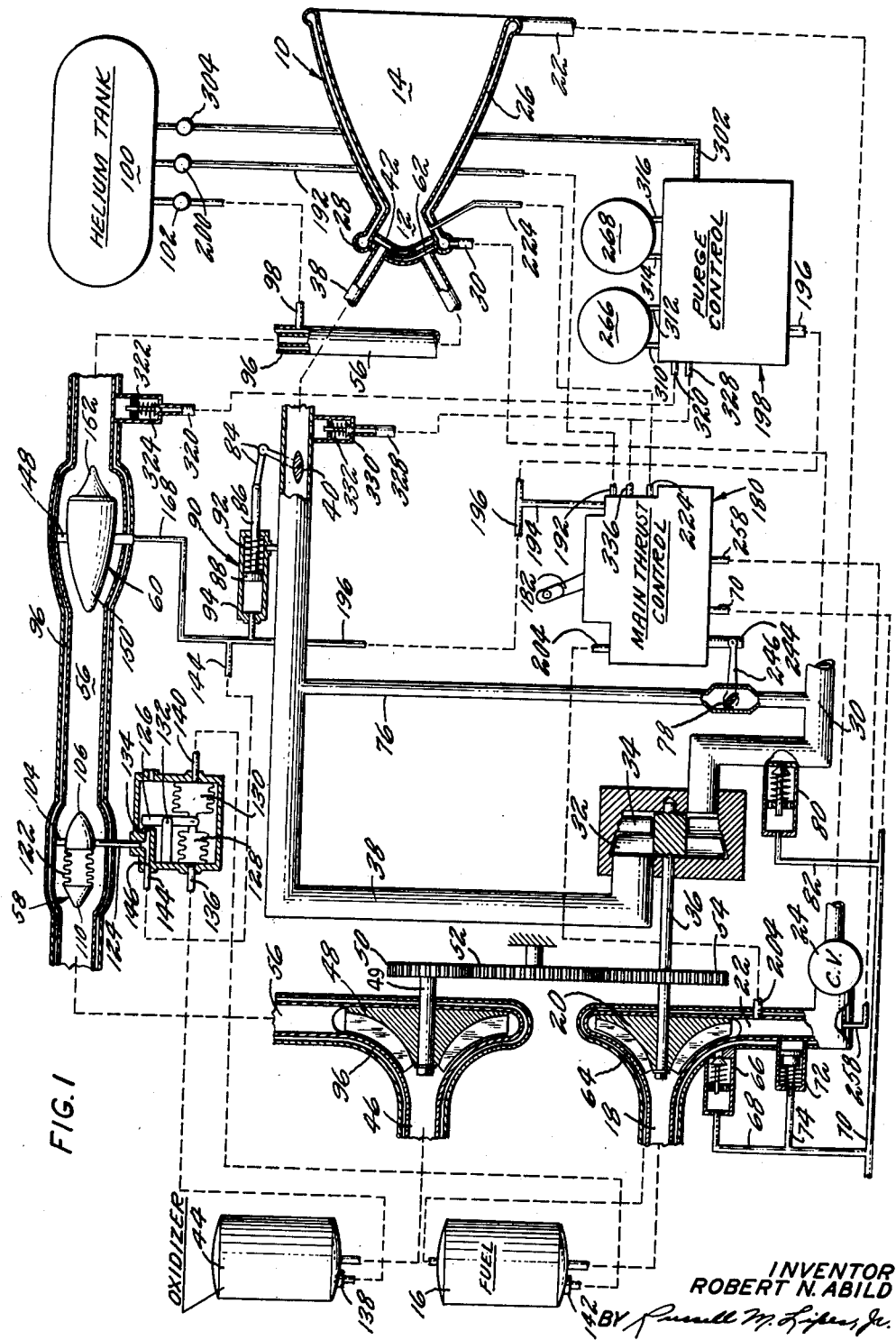
FIG. I
INVENTOR
ROBERT N. ABILD
BY
ATTORNEY July 31, 1962  R. N. ABILD  3,046,734
ROCKET THRUST CONTROL
Filed June 30, 1959  3 Sheets-Sheet 2

INVENTOR
ROBERT N. ABILD
BY
ATTORNEY

July 31, 1962  R. N. ABILD  3,046,734
ROCKET THRUST CONTROL
Filed June 30, 1959  3 Sheets-Sheet 3

INVENTOR
ROBERT N. ABILD
ATTORNEY

United States Patent Office 3,046,734
Patented July 31, 1962

3,046,734
ROCKET THRUST CONTROL
Robert N. Abild, New Britain, Conn., assignor to United Aircraft Corporation, East Hartford, Conn., a corporation of Delaware
Filed June 30, 1959, Ser. No. 824,136
7 Claims. (Cl. 60—35.6)

This invention relates to liquid rocket engines, more particularly to a thrust control for the propellant flow and control system for one of the stages of a rocket vehicle.

An object of this invention is to provide an improved thrust control for a liquid rocket engine.

Another object of the invention is to provide an improved thrust control which permits variable thrust performance by a liquid rocket engine.

Another object of the invention is to provide a thrust control for the propellant flow and control system of a rocket engine which through movement of a single lever controls operation of propellant shutoff valves and variably controls engine thrust.

Another object of this invention is to provide in a rocket engine thrust control a single control lever, actuation of which initiates operation and thrust production by the engine, variably controls thrust level, terminates operation and thrust production, and initiates all necessary purging of the propellant system.

Another object of this invention is to provide a rocket engine thrust control which compensates for any transient tendency of the engine pump drive turbine to overspeed.

Still another object of this invention is to provide in a rocket engine thrust control means governed by the control lever to initiate at starting the flow of servo fluid to the control, and to terminate upon stopping the flow of servo fluid in order to conserve such fluid.

Other objects and advantages will be apparent from the following specification and claims, and from the accompanying drawings which illustrate an embodiment of the invention.

In the drawing:

FIG. 1 is a schematic diagram of the propellant flow and control system of my invention.

Figure 3:
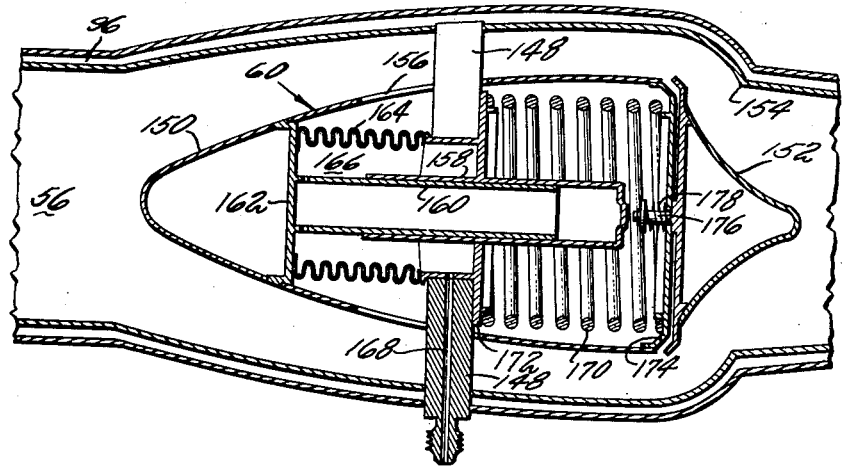
FIG. 3 is an enlarged section view of the main propellant oxidizer valve.

Referring to FIG. 1 of the drawing in detail, 10 indicates a rocket thrust chamber comprising combustion chamber 12 and nozzle 14. Two propellants, one a fuel and the other an oxidizer, are separately fed to the chamber. The propellants preferably are hypergolic and will ignite spontaneously when mixed in the chamber.

The basic flow path for each propellant will first be traced and then the detailed elements connected with each path will be discussed.

Fuel such as liquid hydrogen is contained in tank 16 and will flow from the tank through conduit 18 to centrifugal pump 20. Fuel flows from the pump through conduit 22 and past check valve 24 to thrust chamber 10 where it is admitted to jacket 26 surrounding the thrust chamber. The fuel flows through the jacket to collector 28 at the upstream end of the thrust chamber. From here the fuel flows through conduit 30 to pump drive turbine 32, which has inlet guide vanes 34 and which is connected to pump 20 by shaft 36. The fuel then flows through conduit 38 and past main propellant fuel valve 40 to manifold 42 from which it is injected through a plurality of openings into combustion chamber 12.

Oxidizer such as liquid fluorine is contained in tank 44 which is connected by conduit 46 to centrifugal pump 48. The pump is mounted on gear shaft 49 which carries gear 50 meshes with idler gear 52, which in turn meshes with gear 54 on shaft 36. Oxidizer flows from the pump through conduit 56, past propellant utilization valve 58, and past main propellant oxidizer valve 60 to manifold 62 from which it is injected through a plurality of openings into combustion chamber 12 for mixing with the fuels.

Between fuel tank 16 and check valve 24, conduit 18, the casing for centrifugal pump 20 and the upstream end of conduit 22, are surrounded by cooling jacket 64. The jacket is connected to the top of tank 16 and contains boil-off gases from the tank. The purpose of the jacket is to keep conduit 18 and pump 20 as cool as possible prior to a start and thus minimize the possibility of the vaporizing of the liquid fuel therein. Vent valve 66 is provided on the casing of pump 20 and normally is spring loaded closed. The vent valve permits the escape of boil-off vapors from the jacket and thus assures flow through the jacket. This prevents the collection of bubbles along the inner wall of the jacket and otherwise aids the cooling function of the jacket. Boil-off vapors escaping through the vent valve pass through pipe 68 to pipe 70 through which they are dumped overboard.

Vapor vent valve 72 is mounted in conduit 22 between pump 20 and check valve 24. This valve normally is spring loaded open to allow fuel vapor in the line upstream of the check valve to flow through pipe 74 to vent pipe 70. The vapor vent valve will close upon a build-up of fuel pressure upstream of check valve 24.

Bypass conduit 76 is provided in the fuel flow path between conduits 30 and 38 and allows fuel to be bypassed around pump drive turbine 32. Butterfly valve 78 is located in conduit 76 and the position of the valve determines the relative quantity of fuel flowing through turbine 32. When the valve is closed all of the fuel passes through the turbine. As the valve is opened a continuously decreasing proportion of the fuel delivered by pump 20 flows through the turbine, the remainder flowing through conduit 76. The position of butterfly valve 78 is controlled by a main thrust control to be described below.

Pressure vent valve 80 is located in fuel conduit 30 between bypass conduit 76 and turbine 32 and normally is spring loaded closed. The valve prevents a fuel pressure build-up beyond structural limits in conduit 30 by venting fuel vapor through pipe 82 to pipe 70.

Main propellant fuel valve 40 is connected by links 84 to stem 86 of piston 88 in valve actuator 90. Piston 88 normally is loaded by spring 92 to the left in actuator housing 94 to close the fuel valve. The actuator will be pressurized to open the valve when the rocket engine is started as will be described below.

Between oxidizer tank 44 and combustion chamber 12, conduit 46, the casing for centrifugal pump 48 and conduit 56 are surrounded by jacket 96. The jacket is connected by pipe 98 to helium tank 100, the helium being admitted to the jacket under high pressure to prevent any leakage of the liquid fluorine oxidizer out of the system. Pressure regulator 102 maintains a constant pressure in jacket 96 regardless of variations in tank pressure. In the event that liquid oxygen is used as the oxidizer, the jacket would be connected to the top of tank 44 similarly to the connection for fuel cooling jacket 64 so that boil-off gases from the tank could be used to cool the oxidizer system.

Figure 2:
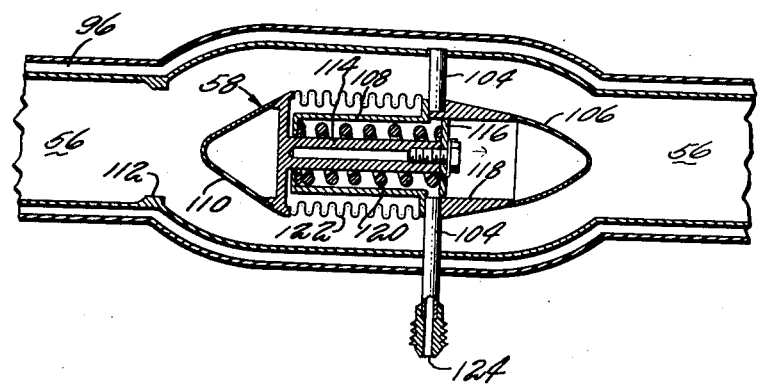
FIG. 2 is an enlarged section view of the propellant utilization valve.

Propellant utilization valve 58 is mounted on struts 104 within oxidizer conduit 56 and, as shown in FIG. 2, includes stationary housing 106 having guide 108 projecting therefrom in an upstream direction. Bullet 110 is the movable portion of the valve and cooperates with restriction 112 to define valve area. Stem 114 projects in a downstream direction from the bullet and terminates in piston 116. The stem is supported by the flanged end of guide 108 and the piston is supported by the walls of chamber 118 within housing 106. Spring 120 surrounds stem 114 between the flanged end of guide 108 and piston 116. Bellows 122 surrounds guide 108 and connects housing 106 and bullet 110. Spring 120 tends to move bullet 110 to the right in an opening direction and this loading is opposed by a variable pressure admitted to the interior of bellows 122 through passage 124 in lower mounting strut 104.

The pressure in passage 124 is regulated by flappper valve 126, FIG. 1, which is connected at one end to a pair of opposed bellows, 128 and 130. The pressure loading of the bellows rotates the flapper valve about fulcrum 132 to vary the area of nozzle 134. Bellows 128 is connected by line 136 to pressure transmitter 138 at the bottom of oxidizer tank 44 and bellows 130 is connected by line 140 to pressure transmitter 142 at the bottom of fuel tank 16.

Actuating fluid for the system is fed through pipe 144 from helium tank 100 as will be explained below, restriction 146 being located in the pipe immediately upstream of passage 124. By virtue of the structure, changes in the pressure loading between bellows 128 and 130 rotate flapper valve 126 to vary the area of nozzle 134 and control the pressure within bellows 122 to adjust the position of bullet 110 accordingly.

Main propellant oxidizer valve 60 is located in the oxidizer conduit downstream of propellant utilization valve 58. The oxidizer valve is mounted on struts 148 as shown in FIG. 3, and is comprised of streamlined shell 150 which is movable longitudinally in the conduit, the flange on nose section 152 of the shell contacting seat 154 when the valve is closed. The shell has slots 156 through which struts 148 extend and which permit longitudinal sliding of the valve structure. Bearing 158 is connected to the inner ends of the mounting struts and serves as a guide for shaft 160 connected to partition 162. Bellows 164 is connected to the bearing structure and the partition and defines chamber 166 to which an actuating pressure is admitted through passage 168 in lower mounting strut 148 from helium tank 100 when the rocket is started.

Spring 170 is mounted between plate 172 and end wall 174 and normally serves to locate the valve against seat 154. Nose section 152 is loosely connected to end wall 174 by hub 176 to permit self-alignment of the nose section with the seat when the valve is closed. Spring 178 surrounding the hub holds the nose section in position against the end plate.

The thrust of the rocket engine is governed by main thrust control 180 through regulation of butterfly valve 78 in bypass conduit 76. The thrust control is shown in detail in FIG. 4 and includes power lever 182 which is mounted on and rotates shaft 184. A pair of cams, 186 and 188, are also mounted on the shaft and are rotated when the power lever is rotated. The surface of cam 186 has a dual cam track, one track being in contact with needle valve 190 which controls the admission of helium from pipe 192, connected to helium tank 100, to pipe 194. Helium flows through pipe 194 into pipe 196, FIG. 1, from which a signal pressure is introduced to main propellant fuel valve housing 94, to bellows 122 in propellant utilization valve 58, and to bellows 164 in main propellant oxidizer valve 60. Pipe 196 also is connected to purge control 198, the operation of which will be described below. Pressure regulator 200 in pipe 192 maintains a constant helium pressure in the pipes.

The other track on cam 186 is in contact with needle valve 202 which controls the admission of fuel from conduit 22 through pipe 204, restriction 206 and passage 208 to nozzle 210. The area of nozzle 210 is controlled by flapper valve 212 which pivots about fulcrum 214 on flexible partition 216 and the right end of which is connected to a pair of opposed bellows, 218 and 220. Bellows 218 is evacuated while the interior of bellows 220 is connected by passage 222 and pipe 224 to combustion chamber 12. The combustion chamber pressure within bellows 220 tends to rotate the flapper valve about fulcrum 214 in a clockwise direction.

The midportion of flapper valve 212 is loaded by a power lever imparted loading which tends to rotate the flapper valve in a counterclockwise direction about its fulcrum. The power lever loading is imparted by cam 188 which contacts follower 226 on guide piston 228 which is guided in bushing 230. Spring 232 is mounted between guide piston 228 and plate 234 connected to the flapper valve. Any difference between the input loading to the flapper valve from cam 188 and the absolute combustion chamber pressure input results in rotation of the flapper valve and variation of the area of nozzle 210.

When the area of nozzle 210 is varied the pressure in chamber 236, connected to passage 208 by passage 238, also is varied. Power piston 240 is located in chamber 236, the piston being loaded in an upward direction by spring 242. Piston stem 244 is connected by link 246, FIG. 1, to butterfly valve 78 in bypass conduit 76.

A follow-up for the servo system is provided by lever 248 which is connected to stem 244 at movable pivot 250 and which is connected at its left end to fixed pivot 252. Spring 254 is mounted between the right end of follow-up lever 248 and the left end of flapper valve 212. By means of the lever and the spring, motion of power piston 240 results in the restoring of the flapper valve to a null position.

Pump overspeed protection is provided by bellows 256 which is internally connected by pipe 258 to fuel conduit 22 near the discharge of fuel pump 20. Should fuel pump speed tend to exceed a predetermined value, the pressure in conduit 22 will increase and bellows 256 will expand. Expansion of the bellows will raise bell housing 260 against the force of spring 262. Abutment 264 on the bell housing will contact flapper valve 212 and the flapper valve will be rotated about fulcrum 214 in a clockwise direction to close nozzle 210. The resulting pressure build-up in chamber 236 will lower piston 240 and open butterfly valve 78. This will bypass more fuel, reducing the quantity flowing through turbine 32, and thus reduce pump speed.

Figure 5:
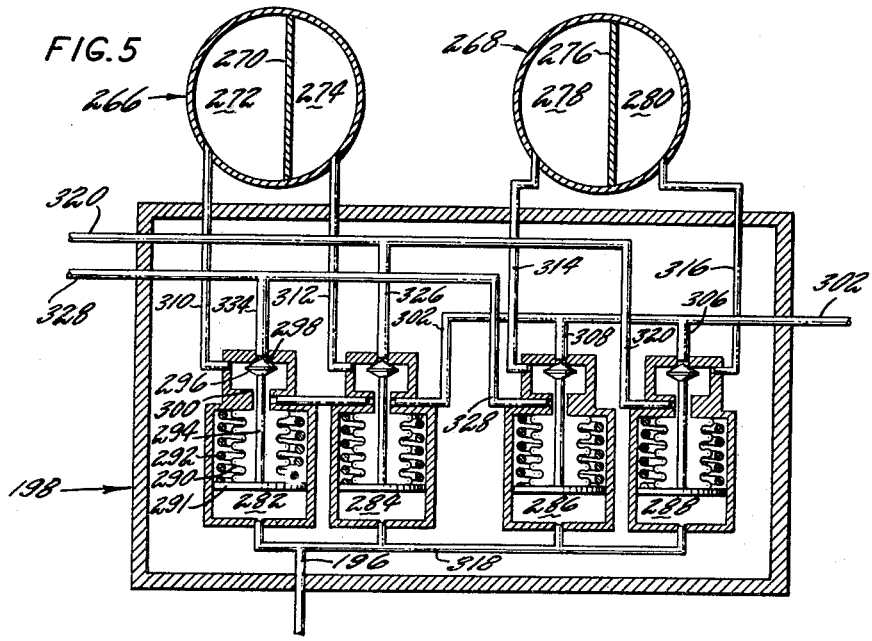
FIG. 5 is an enlarged section view of the purge control and accumulators.

The purge system for the rocket engine includes a pair of accumulators 266 and 268. As shown in FIG. 5, accumulator 266 is divided by wall 270 into chambers 272 and 274 and accumulator 268 is similarly divided by wall 276 into chambers 278 and 280. The chambers in each of the accumulators are of different size depending upon the volume requirements for the individual systems connected thereto.

Purge control 198 contains four chambers, 282, 284, 286 and 288. The large diameter lower portion of each chamber contains a bellows 290 and a bellows end plate 291 which are loaded in a downward direction by a spring 292. A rod 294 extends upward from each bellows end plate and has a double-faced valve 296 attached to its upper end. The upper face of each valve cooperates with an upper seat 298 and the lower face of each valve cooperates with a lower seat 300 in the control casing. The elements in only one of the chambers have been specifically identified in order to avoid unnecessary multiplication of reference numerals on the drawing. All of the elements, however, operate in the same direction at the same time, with all of the valves being moved in a downward direction by the springs to position the valves on lower seats 300 or with the valves being pressure loaded in an upward direction to position the valves on upper seats 298 as shown. Chambers 282 and 284 and their bellows elements are associated with the operation of accumulator 266, while chambers 286 and 288 and their bellows elements are associated with the operation of accumulator 268.

Pipe 302 connects helium tank 100 to purge control 198 and includes pressure regulator 304, FIG. 1, for maintaining a constant pressure in the purge system. Inside the purge control the feed pipe is connected by branch pipe 306 to the top of chamber 288 at the valve upper seat, and by branch pipe 308 to the top of chamber 286 at the valve upper seat. Pipe 302 also is connected to the reduced section midportion of chambers 284 and 282 immediately below the valve lower seat.

The upper portion of chamber 282 is connected by pipe 310 to accumulator chamber 272; the upper portion of chamber 284 is connected by pipe 312 to accumulator chamber 274; the upper portion of chamber 286 is connected by pipe 314 to accumulator chamber 278; and the upper portion of chamber 288 is connected by pipe 316 to accumulator chamber 280. The lower portion of each of the chambers is connected by branch pipe 318 to pipe 196 connected by pipe 194, FIG. 1, to main thrust control 180.

Pipe 320 connects the reduced section midportion of chamber 288 immediately below valve lower seat 300 to check valve 322, FIG. 1, located in oxidizer conduit 56 immediately downstream of oxidizer valve 60. The check valve normally is loaded by spring 324 to close pipe 320. Branch pipe 326 connects the top of chamber 284 at upper seat 298 to pipe 320 and the check valve.

Pipe 328 connects the reduced section midportion of chamber 286 immediately below valve lower seat 300 to check valve 330, FIG. 1, located in fuel conduit 38 immediately downstream of fuel valve 40. The check valve normally is loaded by spring 332 to close pipe 328. Branch pipe 334 connects the top of chamber 282 at the upper seat 298 to pipe 328 and the check valve.

Figure 4:
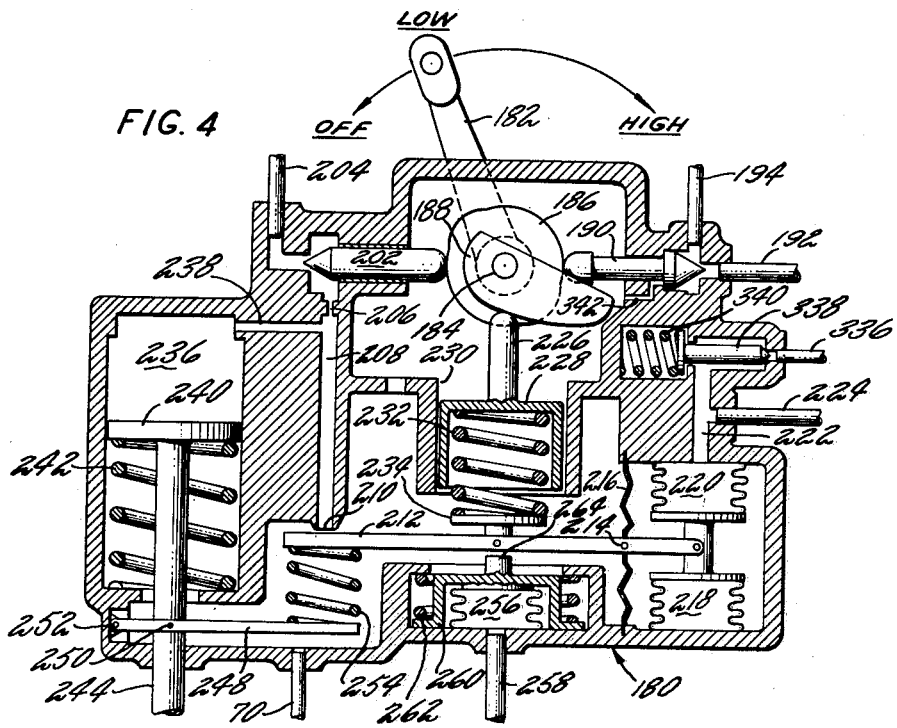
FIG. 4 is an enlarged section view of the main thrust control.

As shown in FIGS. 1 and 4, between purge control 198 and check valve 330, pipe 328 is connected by branch pipe 336 to main thrust control 180. Check valve 338 normally is loaded by spring 340 to close branch pipe 336, but when the pressure in the branch pipe is sufficiently high to open the check valve, connection is afforded by passage 222 between the branch pipe and combustion chamber pressure sensing bellows 220.

*Operation*

In order to operate the rocket engine, both propellant tanks must be filled with cryogenic propellants in a liquid state. The liquid fuel in tank 16 will fill conduit 18, the casing for centrifugal pump 20, and conduit 22 as far as check valve 24. As the tank and the conduits are being filled fuel vapors can escape through vapor vent valve 72 to be vented overboard through pipe 74 and pipe 70, but as the pressure of the liquid fuel in conduit 22 increases the vapor vent valve will close. A certain amount of liquid fuel will flow through check valve 24 and is changed to a vapor state since there is no cooling jacket for the fuel conduit downstream of the check valve. This vaporized fuel will fill the remainder of conduit 22, thrust chamber jacket 26, collector 28, conduit 30, bypass conduit 76, and conduit 38 as far as main propellant fuel valve 40 which will be closed. Any tendency of the vaporized fuel to build up excessive pressure results in the opening of pressure vent valve 80 in conduit 30 and the venting overboard through pipes 82 and 70 of the excess vapor.

As oxidizer tank 44 is filled the liquid oxidizer will fill conduit 46, the casing for centrifugal pump 48, and conduit 56 as far as main propellant oxidizer valve 60 which will be closed. Propellant utilization valve 58 upstream from oxidizer valve 60 is in an intermediate position prior to actual operation of the engine.

Helium from tank 100 will be admitted through pipe 192 to needle valve 190 in main thrust control 180. The needle valve is closed at this time by virtue of the position of power lever 182 in its extreme counterclockwise, or off, position. Helium also is admitted from the tank through pipe 302 to purge control 198. Prior to start of the engine the springs 292 in purge control chambers 282, 284, 286 and 288 have moved the bellows end plates 291 and connected valves 296 in each chamber downward so that the lower face of each valve is in contact with lower seat 300 for each chamber. As a result helium from pipe 302 will flow through branch pipe 306, the upper portion of chamber 288 and pipe 316 to accumulator chamber 280, and also through branch pipe 308, the upper portion of chamber 286 and pipe 314 to accumulator chamber 278. The result is that both chambers in purge accumulator 268 are charged. Helium from line 302 also is admitted to the midportion of chambers 284 and 282, but the helium is dead-ended here because of the position of the valves 296 on the seats 300.

To start the engine, power lever 182 is advanced in a clockwise direction to its low power position. Rotation of the power lever rotates cam 186 to permit needle valve 190 to be opened by the helium pressure in pipe 192. Helium then is admitted through pipe 194 to distribution pipe 196. The right-hand branch of the distribution pipe conducts helium to branch pipe 318 and the lower portion of each of purge control chambers 282, 284, 286 and 288. This pressure will act on the outside of the bellows 290 and move the bellows end plates and attached valves upward until each valve is seated on upper seat 298. The raising of the valves in chambers 282 and 284 permits helium from pipe 302 to flow through the upper portion of chamber 282 and pipe 310 to accumulator chamber 272, and through the upper portion of chamber 284 and pipe 312 to accumulator chamber 274. This charges purge accumulator 266.

The raising of the valve in chamber 286 permits helium from accumulator chamber 278 to flow through pipe 314, the upper portion of chamber 286 and pipe 328 to fuel conduit check valve 330. The helium pressure will open the check valve and helium will be discharged through conduit 38 and manifold 42 into combustion chamber 12, thus purging the fuel conduit downstream of fuel valve 40. Helium in pipe 328 also will enter branch pipe 336 and the pressure of the gas will open check valve 338 in main thrust control 180 to admit helium to pipe 224, connected to combustion chamber 12. This will purge the combustion chamber pressure line and the combustion chamber. The raising of the valve in chamber 288 permits helium from accumulator chamber 280 to flow through pipes 316, the upper portion of chamber 288 and pipe 320 to oxidizer conduit check valve 322. The helium pressure will open the check valve and helium will be discharged through conduit 56 and manifold 62 into combustion chamber 12, thus purging the oxidizer conduit downstream of oxidizer valve 60. Both check valves 330 and 322 will close when the pressure of the helium from accumulator 268 drops below the spring loading on the check valves.

The left-hand branch of distribution pipe 196 admits helium pressure to fuel valve actuator housing 94 to move piston 88 to the right and open fuel valve 40, and admits helium pressure to oxidizer valve bellows 164 to move shell 150 to the left and open oxidizer valve 60. Helium also is admitted from the distribution pipe to utilization valve bellows 122 and associated flapper valve nozzle 134.

Rotation of the power lever and cam 186 permits the fuel pressure in pipe 204 to open needle valve 202. Fuel then will be admitted through restriction 206 to chamber 236 and to flapper valve nozzle 210. The servo system for regulating the position of bypass butterfly valve 78 thus is activated and is ready for thrust controlling operation. The rotation of the power lever also rotates cam 188 to load flapper valve 212 through follower 226, guide piston 228 and spring 232. A selected thrust input signal to the flapper valve thus is supplied which tends to rotate the flapper valve in a counterclockwise direction about fulcrum 214 and increase the area of nozzle 210. This prevents a pressure build-up in chamber 236 and spring 242 holds piston 240 in its upper position to maintain butterfly valve 78 closed. In this position, thrust control valve 78 provides the maximum flow of fuel vapor through the driving turbine, with the result that the maximum available power is applied to the pumps for starting. The butterfly valve will stay closed until the combustion chamber pressure sensed by bellows 220 reaches a value sufficient to rotate the flapper valve in a clockwise direction, causing an increase of fuel pressure in chamber 236 to overcome the load of spring 242, and move piston 240 downward.

When fuel valve 40 and oxidizer valve 60 have been opened by helium pressure, fuel vapor and liquid oxidizer will start to flow at tank pressure to combustion chamber 12 where they will ignite spontaneously upon mixture with each other.

The heat of the combustion gases in thrust chamber 10 increases the temperature of jacket 26 surrounding the thrust chamber. This increases the temperature of the fuel vapor therein, increasing its energy level. This increase in energy permits turbine 32 to accelerate, fuel pump 20 and oxidizer pump 48, increasing the propellant pressures in conduits 22, 30, 38 and 56. As the speed of the propellant pumps increases, a continuously increasing quantity of fuel and oxidizer is delivered to the combustion chamber. This will increase the combustion level in the combustion chamber to generate more heat and to further heat the fuel vapor in jacket 26. The fuel vapors in turn will drive turbine 32 faster to further increase propellant pump speed and propellant flow.

With an increased flow of propellants to combustion chamber 12, the pressure sensed by bellows 220 in the main thrust control is increased and flapper valve 212 is rotated in a clockwise direction. This will increase the pressure in chamber 236 to lower piston 240 and open bypass valve 78. At the point where the forces acting upon flapper valve 212 are in equilibrium the quantity of vaporized fuel flowing to turbine 32 is just sufficient to drive the propellant pumps at a delivery rate producing the selected thrust and the excess of the fuel is by-passed through conduit 76. A change in power lever position to increase or decrease the selected thrust results in an input signal to the flapper valve which produces an appropriate change in bypass valve opening so that the propellant pumps are driven at the speed producing the required thrust. If the speed of the pumps should tend to exceed a predetermined limit, the resulting pressure build-up in bellows 256 will raise abutment 264 to contact flapper valve 212 and close nozzle 210. The pressure in chamber 236 will be increased to drive piston 240 downward and open bypass valve 78. This will reduce the quantity of fuel flowing to the pump drive turbine, and hence reduce the speed of the propellant pumps.

The position of propellant utilization valve 58 is adjusted in response to a signal derived from each propellant tank and sensed by bellows 128 and 130. The purpose of the valve is to insure that the two propellants are used in their correct proportions, and both propellant tanks are emptied at the same time. A difference in the pressure forces of the bellows will rotate flapper valve 126 to vary the area of nozzle 134 and vary the pressure within valve bellows 122. The position of bullet 110 thus will be changed to control the flow area of conduit 56 and either increase or decrease oxidizer flow rate in proportion to the fuel flow rate.

To shut down the engine, power lever 182 is moved to its off position and cam 186 will close needle valves 190 and 202. The closing of needle valve 190 cuts off the helium signal pressure to distribution pipe 196. The helium pressure in the distribution pipe is vented through drain line 342 in the main thrust control, the interior of the control being connected to vent pipe 70.

When the signal pressure to the distribution pipe is cut off, spring 92 will close fuel valve 40 and spring 170 will close oxidizer valve 60. Closing of the valves terminates the flow of propellants to combustion chamber 12.

The venting of the signal pressure in distribution pipe 196 also will relieve the pressure in the lower portions of purge control chambers 282, 284, 286 and 288. The spring 292 in each chamber will force each valve downward to sit on lower seat 300. The lowering of the valve in chamber 282 results in helium from accumulator chamber 272 flowing through pipe 310, the upper portion of chamber 282, branch pipe 334, and pipe 328 to fuel conduit check valve 330. The helium pressure will open the check valve and purge the fuel conduit downstream of fuel valve 40. Helium also is admitted from pipe 330 through branch pipe 336 to open check valve 338 in the main thrust control and purge combustion pressure pipe 224. The lowering of the valve in chamber 284 permits helium from accumulator chamber 274 to flow through pipe 312, the upper portion of chamber 284, branch pipe 326, and pipe 320 to oxidizer conduit check valve 322. The helium pressure will open the check valve and purge the oxidizer conduit downstream of oxidizer valve 69.

The lowering of the valves in each of chambers 286 and 288 permits the recharging of accumulator chambers 278 and 280 in purge accumulator 268.

After the engine has been shut down, propellant flow will have been stopped by the closing of the fuel and oxidizer valves, the pump drive turbine will stop, both propellant lines will have been purged, and purge accumulator 268 will be charged in anticipation of operation of the engine again.

It is to be understood that the invention is not limited to the specific embodiment herein illustrated and described but may be used in other ways without departure from its spirit as defined by the following claims.

I claim:

1. A thrust control for a rocket engine having a combustion chamber, a source of propellant, and means including pumping means for delivering said propellant to said combustion chamber, said control including means for selecting the thrust level for said engine, means responsive to the pressure in said combustion chamber for sensing the actual thrust of said engine, servo motor means responsive to the difference between selected thrust and actual thrust to establish selected thrust, and means responsive to an operating condition of said pumping means to vary the servo motor output.

2. In a liquid rocket engine having a propellant system through which dual propellants are delivered to a combustion chamber, means for pumping said propellants through said system, means for heating one of said propellants, means for driving said pumping means by expansion of said heated propellant, means for regulating the quantity of heated propellant flowing to said pumping means, and thrust control means for controlling said quantity regulating means, said thrust control including manually positioned means for delivering a signal of selected thrust to said quantity regulating means, means responsive to the pressure in said combustion chamber for delivering a signal of actual thrust to said quantity regulating means, and means responsive to an operating condition of said pumping means to establish the maximum operating limit of said pumping means.

3. In a liquid rocket engine having a propellant system through which dual propellants are delivered to a combustion chamber, means for pumping said propellants through said system, means for heating one of said propellants, means for driving said pumping means by expansion of said heated propellant, means for regulating the quantity of heated propellant flowing to said pumping means, and means for controlling said quantity regulating means, said controlling means including a servo motor means operatively connected with said quantity regulating means, a power lever, means actuated by movement of said power lever to admit one of said propellants to admit to said servo motor as a motor fluid, means actuated by movement of said power lever to deliver a signal of selected thrust to said quantity regulating means, means responsive to the pressure in said combustion chamber to deliver a signal of actual thrust to said quantity regulating means, and means responsive to an operating condition of said pumping means to establish the maximum operating limit of said pumping means.

4. In a liquid rocket engine having fuel conduit means and oxidizer conduit means through which propellants are delivered to a combustion chamber, means for pumping said fuel and said oxidizer through said conduits, a valve in each conduit for shutting off propellant flow to said combustion chamber, means for heating fuel by the heat generated in said combustion chamber, means for driving said pumping means by expansion of said heated fuel, means for regulating the quantity of heated fuel flowing to said pumping means, and thrust control means for controlling said quantity regulating means, said thrust control means including servo motor means operatively connected with said quantity regulating means, a power lever, means actuated by movement of said power lever to admit fuel to said servo motor means as a motor fluid, means actuated by said power lever to admit a signal pressure to open said shutoff valves, means actuated by said power lever to deliver a signal of selected thrust to said thrust control means, and means responsive to the pressure in said combustion chamber to deliver a signal of actual thrust to said thrust control means.

5. In a liquid rocket engine having fuel conduit means and oxidizer conduit means through which propellants are delivered to a combustion chamber, means for pumping said fuel and said oxidizer through said conduits, a valve in each conduit for shutting off propellant flow to said combustion chamber, means for heating fuel by the heat generated in said combustion chamber, means for driving said pumping means by expansion of said heated fuel, means for regulating the quantity of heated fuel flowing to said pumping driving means, and thrust control means for controlling said quantity regulating means, said thrust control means including servo motor means operatively connected with said quantity regulating means, a motor fluid supply for said servo motor means, flapper valve means regulating the pressure of said motor fluid within said servo motor means, a power lever, means actuated by movement of said power lever to admit said motor fluid to said servo motor means, to admit a signal pressure to open said shutoff valves and to move said flapper valve in one direction, and means responsive to the pressure in said combustion chamber to move said flapper valve in an opposite direction.

6. In a liquid rocket engine having fuel conduit means and oxidizer conduit means through which propellants are delivered to a combustion chamber, means for pumping said fuel and said oxidizer through said conduits, a valve in each conduit for shutting off propellant flow to said combustion chamber, means for heating fuel by the heat generated in said combustion chamber, means for driving said pumping means by expansion of said heated fuel, means for regulating the quantity of heated fuel flowing to said pump driving means, and thrust control means for controlling said quantity regulating means, said thrust control means including servo motor means operatively connected with said quantity regulating means, a motor fluid supply for said servo motor means, flapper valve means regulating the pressure of said motor fluid supply, a power lever, means actuated by movement of said power lever to admit said motor fluid to said servo motor means, to admit a signal pressure to open said shutoff valves and to move said flapper valve in one direction, means responsive to the pressure in said combustion chamber to move said flapper valve in an opposite direction, and means responsive to overspeed of said pumping means for reducing the quantity of heated fuel flowing to said pump driving means.

7. In a liquid rocket engine having fuel conduit means and oxidizer conduit means through which propellants are delivered to a combustion chamber, means for pumping said fuel and said oxidizer through said conduits, a valve in each conduit for shutting off propellant flow to said combustion chamber, a utilization valve in one of said conduits for regulating the flow rate of the propellant in that conduit, means for heating fuel by the heat generated in said combustion chamber, means for driving said pumping means by expansion of said heated fuel, means for regulating the quantity of heated fuel flowing to said pumping means, and thrust control means for controlling said quantity regulating means, said thrust control means including servo motor means operatively connected with said quantity regulating means, a power lever, means actuated by movement of said power lever to admit fuel to said servo motor means as a motor fluid, means actuated by said power lever to admit a signal pressure to open said shutoff valves and actuate said utilization valve, means actuated by said power lever to deliver a signal of selected thrust to said thrust control means, and means responsive to the pressure in said combustion chamber to deliver a signal of actual thrust to said thrust control means.

References Cited in the file of this patent

UNITED STATES PATENTS

| | | |
|---|---|---|
| 2,479,888 | Wyld et al. | Aug. 23, 1949 |
| 2,483,045 | Harby | Sept. 27, 1949 |
| 2,794,318 | Zucrow et al. | June 4, 1957 |

OTHER REFERENCES

"Rocket Propulsion Elements," by George P. Sutton 2nd Edition, published by John Wiley & Sons Inc., New York, N.Y., 1956 pp. 298 and 299.